United States Patent [19]

Baldwin

[11] Patent Number: 4,964,659
[45] Date of Patent: Oct. 23, 1990

[54] DIAPHRAGM LATCH MECHANISM

[76] Inventor: William C. Baldwin, 14 Elfin, Irvine, Calif. 92714

[21] Appl. No.: 450,215

[22] Filed: Dec. 11, 1989

Related U.S. Application Data

[63] Continuation of Ser. No. 141,971, Jan. 11, 1988, abandoned.

[51] Int. Cl.$^5$ ................................................ E05C 9/00
[52] U.S. Cl. ................................... 292/19; 292/256.65; 292/260; 70/168; 220/235; 220/323
[58] Field of Search ................. 70/230, 162, 168, 169; 49/465, 466; 220/234, 235, 315, 323; 292/10, 17, 19, 20, DIG. 16, DIG. 11, 260, 86, 90, 91, 256.65, 256.67, 256.61

[56] References Cited

U.S. PATENT DOCUMENTS

| | | | |
|---|---|---|---|
| 609,569 | 8/1898 | Berchtold | 292/260 X |
| 1,015,907 | 1/1912 | Ryder | 292/DIG. 16 X |
| 1,308,794 | 7/1919 | Lynch et al. | 292/55 |
| 1,973,924 | 9/1934 | Kloeb | 220/323 |
| 2,283,371 | 5/1942 | Johnson | 70/168 |
| 2,488,796 | 11/1949 | Baier | 220/235 X |
| 2,735,571 | 2/1956 | Lockwood | 292/19 X |
| 3,606,070 | 9/1971 | Shepherd | 220/234 X |
| 3,791,045 | 2/1974 | Landis et al. | 292/19 X |
| 3,893,584 | 7/1975 | Ledford | 220/323 X |
| 4,534,488 | 8/1985 | Boggs et al. | 220/323 |

FOREIGN PATENT DOCUMENTS

| | | | |
|---|---|---|---|
| 666368 | 9/1938 | Fed. Rep. of Germany | 292/19 |
| 733247 | 2/1943 | Fed. Rep. of Germany | 220/323 |
| 812045 | 8/1951 | Fed. Rep. of Germany | 292/19 |
| 134900 | 11/1929 | Switzerland | 222/235 |
| 251795 | 11/1947 | Switzerland | 220/234 |
| 4449 | of 1902 | United Kingdom | 220/235 |

Primary Examiner—Eric K. Nicholson
Attorney, Agent, or Firm—Price, Gess & Ubell

[57] ABSTRACT

A latching mechanism is provided for enabling perimeter locking for doors and the like. A diaphragm is provided which engages a surrounding frame along the perimeter of the diaphragm. Slots in the diaphragm enable a reduction of the diaphragm perimeter by movement of a central portion of the diaphragm in a direction perpendicular to the original plane of the diaphragm. When the diaphragm perimeter is reduced, simultaneous disengagement between the perimeter and the surrounding frame occurs.

2 Claims, 4 Drawing Sheets

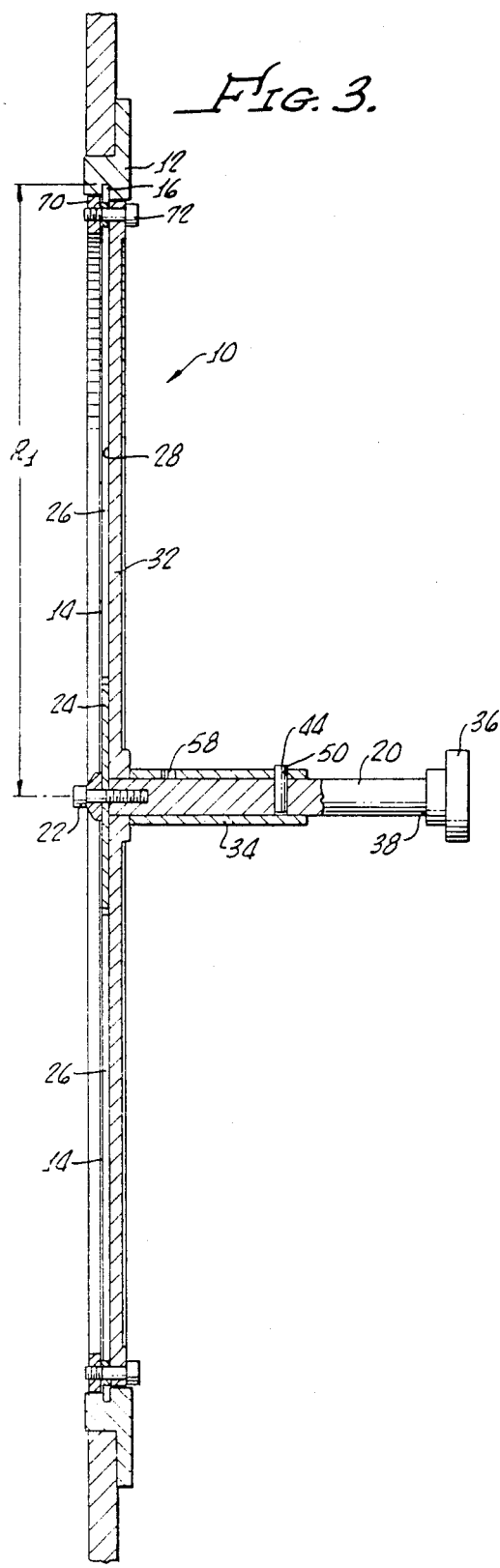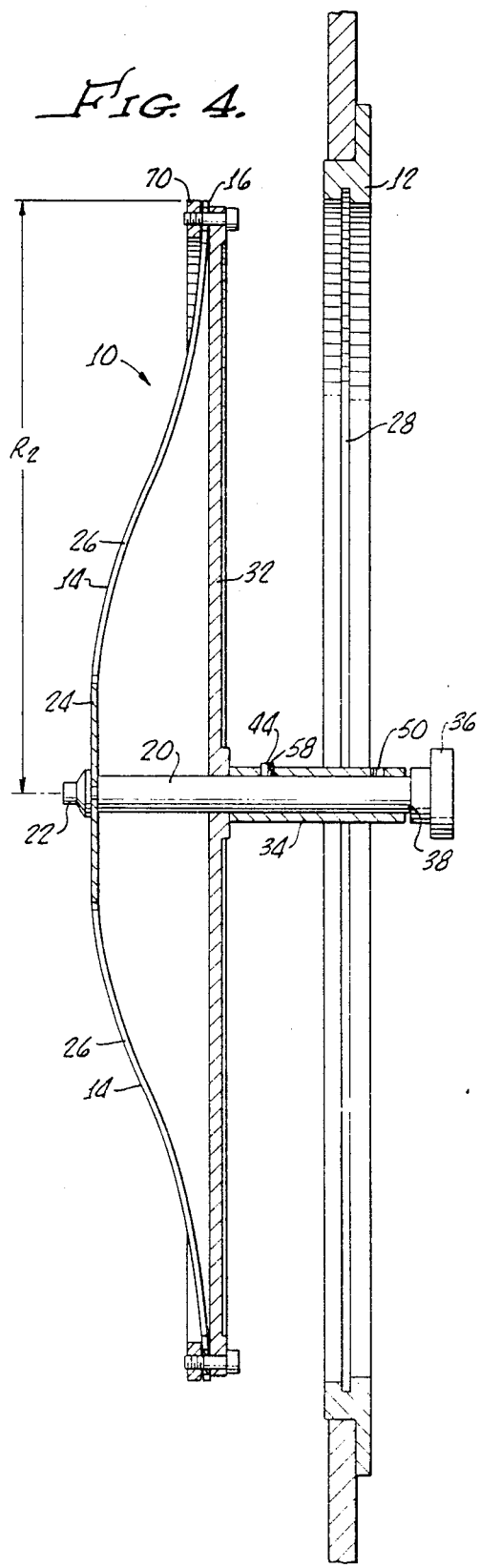

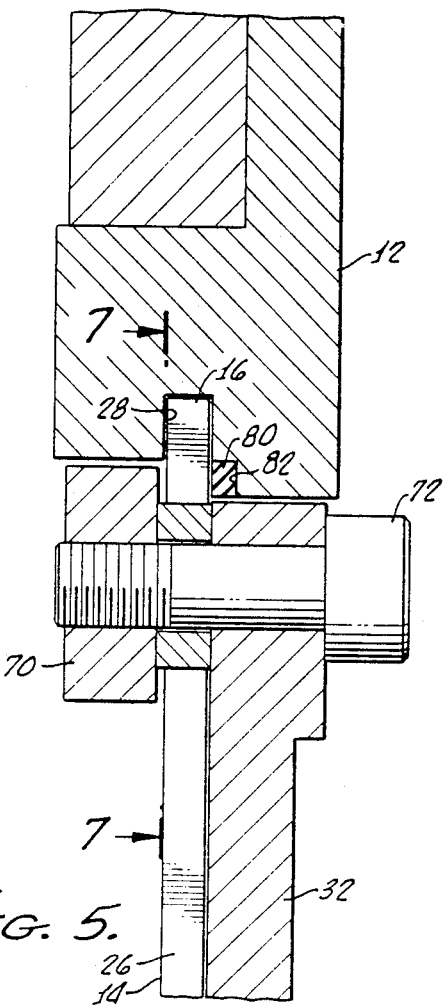
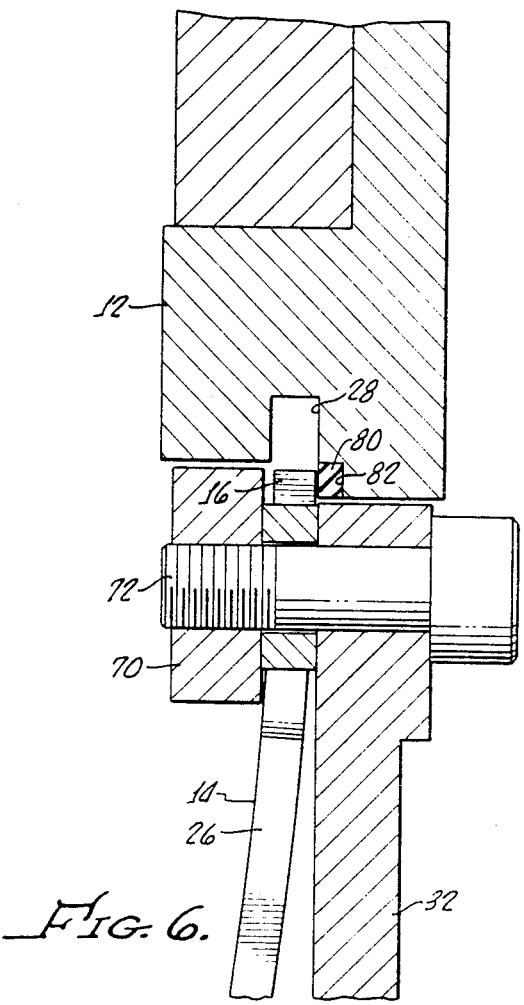
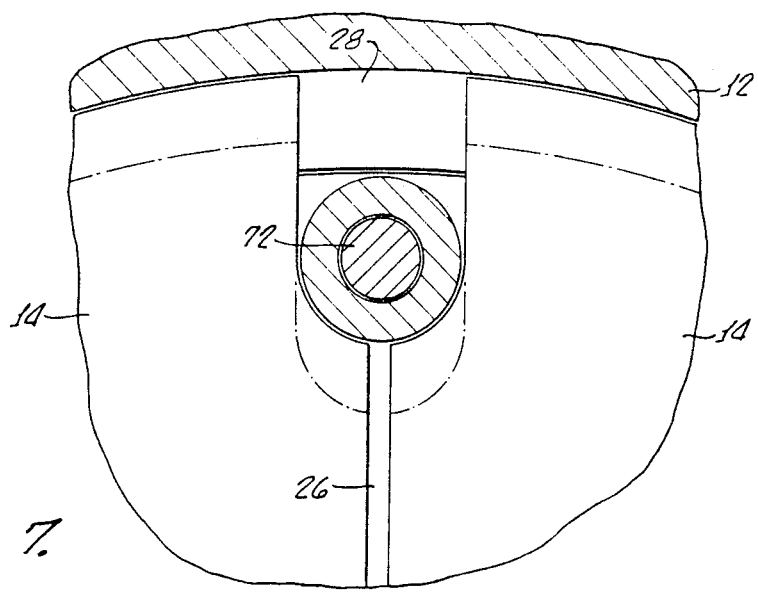

DIAPHRAGM LATCH MECHANISM

This is a continuation of application Ser. No. 141,971, filed on Jan. 11, 1988, now abandoned.

The present invention is directed generally to latch mechanisms and more particularly directed to a latch mechanism for doors and the like, which enables locking of the door along the perimeter thereof.

Perimeter locking of a door is preferable in situations in which security, strength and seal are important.

It is well known that latch mechanisms for locking a door to a frame at numerous points along the door perimeter provide a stronger and more secure lock than latch mechanisms for locking a door which engages a mating frame at only one or more discreet points. While perimeter locking of doors has been known for sometime, the mechanism for implementing this type of locking has heretofore been very elaborate, expensive and, in many instances, unreliable.

Reliability requirements of a latching mechanism may differ, depending upon the intended use of the door. For example, in marine and space applications, escape type doors are large enough for the passage of a person therethrough and may be subjected to large pressure differentials. This type of door is preferably secured to a mating frame at a number of points along the perimeter thereof in order to support the total pressure applied on the door. It should be appreciated that the door itself, when a number of perimeter locks are utilized, can be made lighter and still withstand the pressure thereagainst as compared to a door disposed in the same opening having only one locking point.

In many instances, rapid passage through the opening, to which the door is fitted, is required in situations of emergency.

Heretofore, available locking mechanisms typically use a plurality of pin or rod-like devices, which project from the door into mating openings in the surrounding frame. In order to operate all of these pins for withdrawing them from the mating openings, complex linkages are required, with such linkage becoming more complex with the number of locking pins utilized. The locking and unlocking of this type of latching mechanism typically requires the extended movement of a lever or rotation of an operating wheel through several revolutions. While this operation may appear to be relatively quick, it must be appreciated that, in times of emergencies, fractions of a second may be important. Further, the reliability of the mechanism for simultaneously releasing the perimeter locking pins of the door is of utmost importance. Should one of the pins not be fully retracted, it is generally difficult, if not impossible, to open or remove the door.

Turning to another example of doors with preferred perimeter locking, such as vault doors and the like, it should be appreciated that while a rapid movement of the door is unnecessary, if not undesirable, because of the mass thereof, reliable latching and unlatching of the perimeter locking system is of utmost importance, since the jamming or malfunction thereof may necessitate the destruction of the door to gain entry into the area secured thereby.

The present invention provides for a latching mechanism suitable for many applications, including those hereinabove described. It provides for the latching of a door about the perimeter thereof in a fashion providing sure and secure locking and sealing, while at the same time providing for almost instantaneous and simultaneous release at all locking points along the perimeter of the door. In addition, very little actuation movement is necessary to cause latching or unlatching of the mechanism. In its application for vault doors and the like, the present invention provides for secure perimeter locking at a fraction of the cost of existing vault door lock mechanisms. In addition, because the present invention does not rely on a plurality of interlinked elements, the mechanism is more reliable than that present available. Further, as will be hereinafter described in greater detail, the security provided far exceeds that of conventional locking mechanisms.

SUMMARY OF THE INVENTION

A latching mechanism, according to the present invention, includes both a frame and diaphragm means for engaging the frame along a perimeter of the diaphragm means. Means are also provided, as part of the diaphragm means, for enabling a reduction of the diaphragm means perimeter by movement of a central portion of the diaphragm means in a direction perpendicular to the original plane of the diaphragm means. In this embodiment, the diaphragm means perimeter is sized to engage the frame when it is not reduced and not engage the frame when it is reduced. Thus, a movement of the central portion of the diaphragm means enables an unlocking of the diaphragm means from the frame along the entire perimeter thereof. This feature enables rapid disengagement, or unlocking, which results in a quick release of the door from the frame.

More particularly, the diaphragm means may comprise a resilient member and the means for enabling a reduction of the diaphragm means perimeter may include a plurality of slots which extend from a central portion of the diaphragm means to the diaphragm means perimeter. It should be appreciated that no auxiliary or complicated mechanisms are required to effect a reduction in the diaphragm means perimeter. As set forth in this embodiment, the means for enabling a reduction of the diaphragm means perimeter is incorporated directly into the diaphragm means by way of a plurality of slots as hereinafter shown and described.

The latching mechanism, according to the present invention, may further include means for holding the diaphragm means perimeter in the same plane as the central portion of the diaphragm means is moved in a direction perpendicular to the original plane of the diaphragm means. In addition, the frame may include means defining a slot therein which is sized for accepting the diaphragm means perimeter when the diaphragm means is not reduced. A locking of the diaphragm means to the frame occurs when the diaphragm means perimeter is disposed within the frame slot.

Additionally, there may be provided a non-resilient member, and means attached to the non-resilient member for moving the central portion of the diaphragm means in a direction enabling a reduction of the diaphragm means perimeter. Hence, the non-resilient member provides a reference position from which the diaphragm means may be disposed.

In applications wherein a seal is desired, the frame may include stop means for engaging the diaphragm means along the perimeter thereof and a seal may be disposed between the stop means and the diaphragm means perimeter.

In another embodiment of the present invention, which is particularly adapted for security entrances, such as for vaults or restricted areas, hinge means may be provided for mounting the non-resilient member to the frame.

The diaphragm means, non-resilient member and frame, may be circular. However, in other applications, in accordance with the present invention, the diaphragm means, non-resilient member and frame may be non-circular. In this embodiment, the means defining a slot in the frame may be sized to enable simultaneous disengagement with the diaphragm means perimeter when the diaphragm means perimeter is reduced by movement of the central portion thereof.

There may also be provided means for locking the diaphragm means center portion in a position causing the diaphragm means perimeter to be reduced. In this manner, the placement of the door in the frame for aligning the diaphragm means perimeter with the frame slot means may be facilitated.

More specifically, in embodiments of the present invention which are specifically adapted for quick release of the locking mechanism, means may be provided for pushing the diaphragm means central portion away from the non-resilient member. Conversely, in security applications, an embodiment of the present invention may include means for pulling the central portion of the diaphragm means away from the non-resilient member in order to cause a reduction of the diaphragm means perimeter.

Another feature of the present invention is an embodiment wherein the thickness of the diaphragm means of the perimeter thereof is greater than the thickness of the diaphragm central portion. In this manner, the diaphragm means perimeter, which is in engagement with the frame slot, provides a thickness sufficient to withstand greater shear forces, whereas the operation of unlocking and locking the mechanism through movement of the central portion is not significantly affected because the thickness of the diaphragm central portion need not be increased for the locking mechanism to withstand greater shear forces.

By way of alternate definition of the present invention, a latching mechanism, in accordance with the present invention, may include a circular resilient member having a perimeter and means for enabling the radius of the circular resilient member perimeter to change from a radius $R_1$ to a radius $R_2$ by movement of a central portion of the circular resilient member. In addition, means are provided for engaging the circular resilient member perimeter when it has a radius $R_1$ and not engaging in circular resilient member perimeter when it has a radius $R_2$. As hereinabove set forth, the means for engaging the circular resilient member perimeter includes a frame having slot means therein for engaging the circular resilient member perimeter. In addition, the means for enabling the radius of the circular resilient member perimeter to change from $R_1$ to $R_2$ includes a plurality of slots in the circular resilient member, with each slot extending from the central portion of the circular resilient member to the perimeter thereof.

In order to facilitate the movement of the circular resilient member central portion, a plate is provided along with means, attached to the plate, for moving the central portion of the circular resilient member to change the circular resilient member perimeter from radius $R_1$ to radius $R_2$. Means are also provided for holding the circular resilient member perimeter in the same plane as the central portion of the circular resilient member is moved and such means may include a ring mounted on the plate with the circular resilient member perimeter therebetween.

DESCRIPTION OF THE DRAWINGS

The advantages and features of the present invention will be better understood by the following description and drawings in which:

FIG. 3 is a cross-sectional view of FIG. 1 showing the diaphragm means perimeter engaged in a slot in a surrounding frame;

FIG. 4 is a cross-sectional view similar to FIG. 3, showing the central portion of the diaphragm being displaced from the non-resilient member thereby disengaging the diaphragm means perimeter from the slot in the surrounding frame;

FIG. 5 is an enlarged cross-sectional view more clearly showing the engagement of the diaphragm means perimeter with the slot in the surrounding frame;

FIG. 6 is an enlarged cross-sectional view showing the diaphragm means perimeter withdrawn from the slot when the radius thereof is changed from $R_1$ to $R_2$;

FIG. 7 is an enlarged cross-sectional view showing a portion of the diaphragm means perimeter;

DETAILED DESCRIPTION

Figure 1:
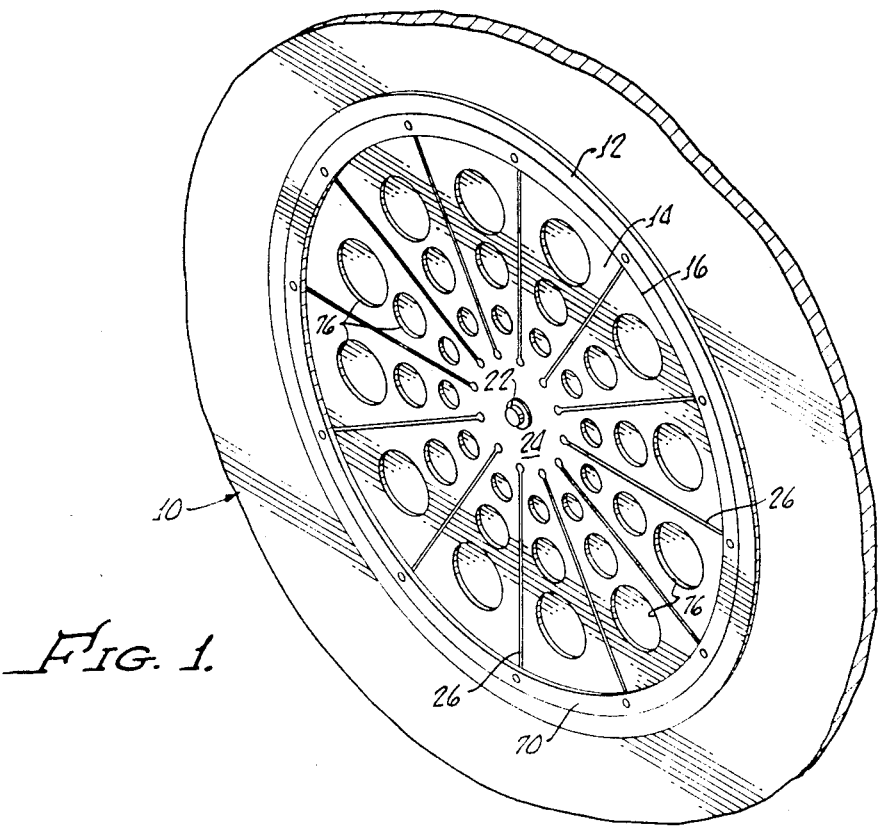
FIG. 1 is a perspective view of one side of a latching mechanism having a diaphragm, in accordance with the present invention.

Turning now to FIG. 1, there is shown a latching mechanism 10 in accordance with the present invention, generally including a surrounding frame 12 and a diaphragm 14 which provides a means for engaging the frame 12 along a diaphragm perimeter 16. As more clearly shown in FIG. 2, a rod 20 attached to a central portion by conventional means, such as a screw 22 (see FIG. 1) provides means for moving a central portion 24 of the diaphragm in a direction generally perpendicular to the original plan of the diaphragm 14.

Turning again to FIG. 1, there is shown a plurality of slots 26 which extend from the central portion 24 to the perimeter 16 of the diaphragm 14 which provide means for enabling a reduction of the diaphragm means perimeter 14 by movement of the central portion 24 by the rod 20.

Figure 2:
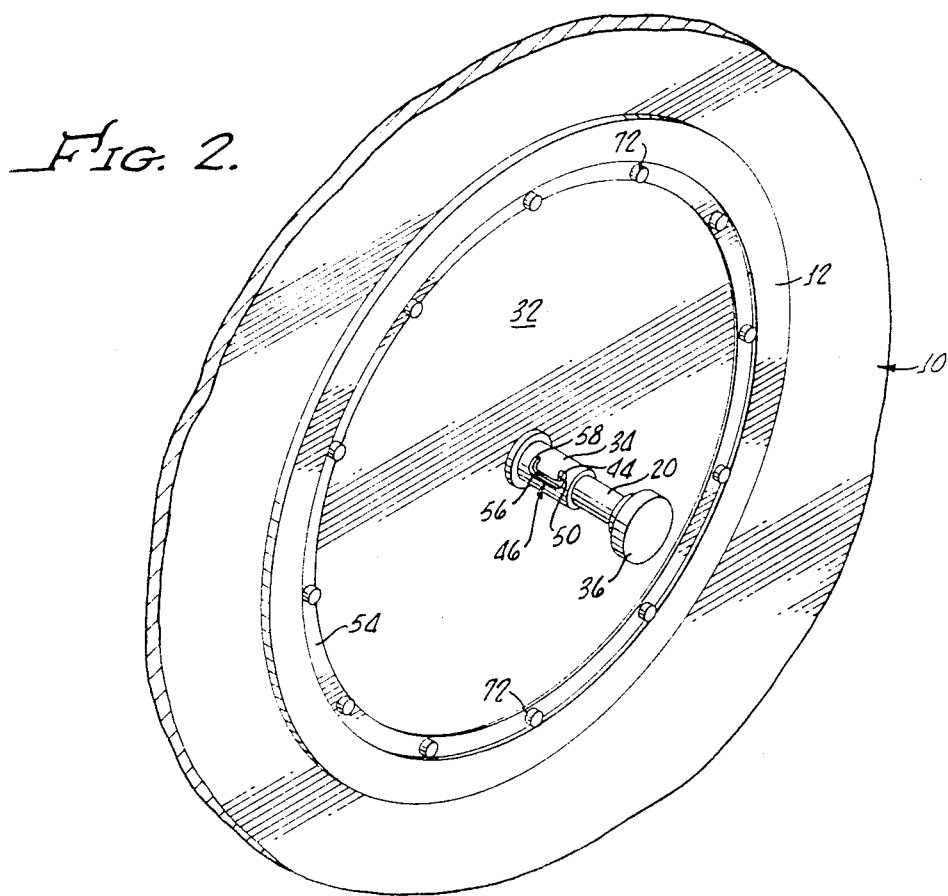
FIG. 2 is a perspective view of an opposite side of the latching mechanism shown in FIG. 1, specifically showing means for moving the diaphragm away from a non-resilient member by movement of the central portion of the diaphragm away from the non-resilient member, locking means are shown for holding the diaphragm means in a position against the non-resilient member and in a position wherein the central portion thereof is displaced from the non-resilient member.

As more clearly shown in the cross-sectional views of FIGS. 2 and 3, movement of the central portion of the diaphragm means in a direction generally perpendicular to the original plane thereof causes a reduction in the perimeter 16 which is sized to engage frame 12 by way of a slot 28 when the perimeter 16 is not reduced (FIG. 3) and to not engage the frame slot 28 when it is reduced (FIG. 4).

The rod 20 is slidably mounted to a plate, or non-resilient member, 32 by way of a sleeve 34 attached thereto. In order to facilitate movement of the rod in a plane perpendicular to the plate 32, a knob 36 may be disposed on a rod end 38 opposite the screw 22.

In order to lock the perimeter 16 with a radius $R_1$ into the slot 28, the rod 20 is provided with a key 44 and the sleeve 34 is provided with a keyway 46 (FIG. 2) which enables the rod 20 to be rotated by the knob 36 so that the key 44 rests in a first keywell 50 for locking the diaphragm in place with the perimeter 16 extending into the slot 28 to prevent inadvertent opening thereof. To operate the diaphragm, the knob is rotated in an opposite direction, thereby enabling the key to slide along a central portion 56 (FIG. 2) of the keyway, and the rod to move the central portion 24 away from the plate 32. This movement of the central portion 24 reduces the perimeter 16 of the diaphragm 14 from a radius $R_1$ to a radius $R_2$ whereupon it disengages from the slot 28 and the plate 32 and diaphragm 14 are free to be moved away from the frame 12 by continued motion of the rod 20 and knob 36.

In order to facilitate replacement, the key 44 and a second keywell 58 provide means for locking the diaphragm means center portion 24 in the position causing the diaphragm means perimeter 16 to be reduced. This occurs when the rod 20 is pushed into the sleeve 32 and rotated so that the key 44 is disposed in a second keywell 58.

With the diaphragm 14 locked in this position respective to the plate 32, the perimeter 16 is reduced enabling the plate 32 and diaphragm 14 to be disposed in the frame and aligned so that rotation of the rod 20 and key 44 from keywell 58 enables the resilient diaphragm 14 to push the rod 20 outwardly from the plate, restoring the diaphragm 14 in its position against the plate 20 as shown in FIG. 2, within the perimeter 16 engaged in the slot 28.

In order to maintain the perimeter 16 in the same plane, as it is reduced in perimeter, a ring 70 is attached to the plate 32 by means of bolts 72 screwed into the ring 70, with a tightening force enabling the diaphragm perimeter 16 to the slidably held between the ring 70 and the plate 32.

The diaphragm 14 may be composed of any suitable material, such as plastic, steel or aluminum, having sufficient thickness and sufficient slots 26 therein to enable resilient movement to enable the perimeter thereof to change from a radius $R_1$ to a radius $R_2$. Optionally, a plurality of holes 76 may be provided for reducing the weight of the diaphragm 14 and overall weight of the latching member 10 and for adjusting the force necessary to move the diaphragm central portion 24 and reduce the perimeter 16.

It should be appreciated that the overall size of the diaphragm may range from a few inches to many feet, the latter size enabling the passage of a person therethrough. The latching mechanism 10 is particularly adapted to large size applications, such as portholes and the like, because of lightweight nature of the mechanism and the security of the latch provided In addition, it can be easily seen that the movement of the rod 20, pushing the diaphragm 14 from the plate 32, as shown in FIG. 3, enables the total disengagement of the plate by a single linear movement of the knob 36. It should be appreciated that the required force necessary to displace the central portion of the diaphragm is dependent upon the size and thickness of the diaphragm as well as the number and size of the slots disposed therein. All of these parameters can be determined in an empirical manner without undue experimentation.

A seal 80 may be provided and disposed between a stop 82 on the frame 12 for engaging the diaphragm 14 along the perimeter 16 thereof. This embodiment is shown in FIGS. 5 and 6 which also show, respectively, the diaphragm 16 engaged in the slot 28 and removed from the slot 28. FIG. 7 is a plan view showing the movement of the diaphragm perimeter 16 as it disengages the slot 28 when the central portion 24 is pushed away from the plate 32 by the rod 30.

Figure 8:
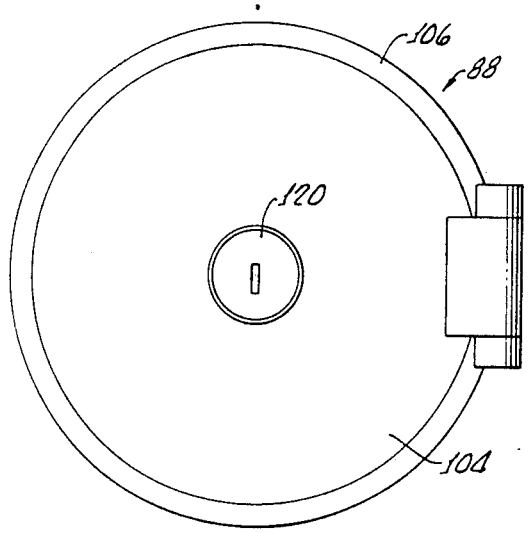
FIG. 8 is another embodiment of the present invention suitable for security application in which the non-resilient member is hinge-mounted to a surrounding frame.
Figure 9:
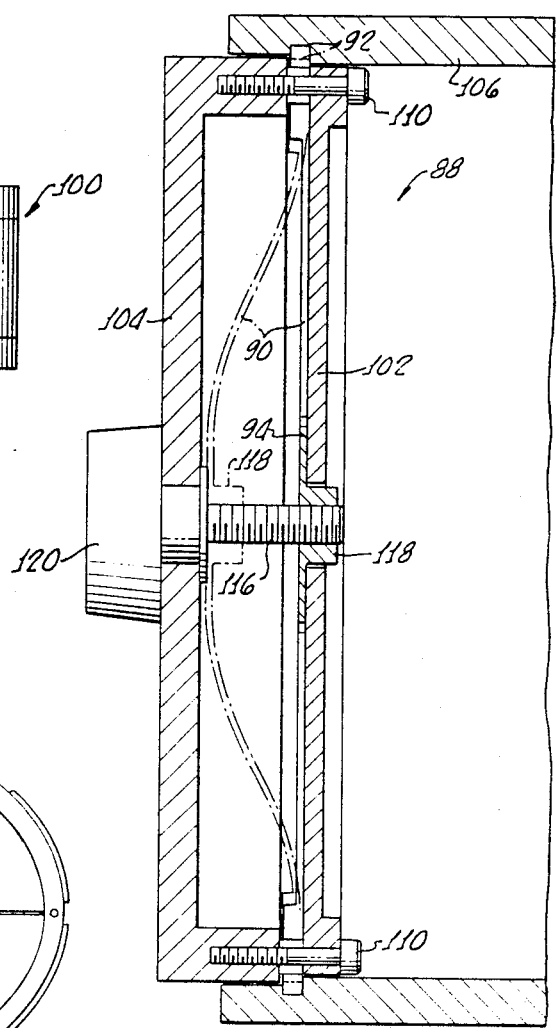
FIG. 9 is a cross-sectional view taken along line 9 of FIG. 7 showing, in this embodiment of the present invention, means for pulling the resilient member away from the non-resilient member in order to cause a reduction of the diaphragm means perimeter.

Turning now to FIGS. 8 and 9, there is shown an embodiment 88 of the present invention which is suitable for use in security applications, such as safety deposit boxes and walk-in vaults (not shown). Generally, this embodiment 88 includes a diaphragm 90 similar in structure to that of diaphragm 14 except that the perimeter 92 has a thickness greater than the central portion 94 of the diaphragm 90. In this manner, the latching mechanism 88 is able to resist greater shear forces without significantly affecting the weight of the diaphragm 90 or its preselected resilient characteristics. As shown in FIG. 8, this embodiment includes hinges 100 for rotatably mounting a plate 102 and diaphragm housing 104 to a frame 106. In this configuration, the diaphragm 90 is disposed between the plate 102 and housing 104 to prevent access to the diaphragm 90. The housing 104, which may be mounted to the plate 102 by screws 110, takes the place of the ring 70 shown in the embodiment of FIGS. 1–7 and is attached to the plate 102 for enabling slidably movement of the perimeter 92 therebetween as it is reduced in size by movement away from the plate 102 by a screw drive 116, or the like. The screw drive 116 is coupled to the central portion 94 of the diaphragm 90 through a threaded portion 118 thereof and extends into a rotatable knob 120.

Security is provided in this device in that it is necessary to pull the diaphragm 90 away from the plate 102 in order to reduce the perimeter 92 thereof for disengaging the diaphragm perimeter from the frame 106. It should be appreciated that the diaphragm 90, may be, for example, one-quarter inch steel, so that a considerable force is necessary to move the central portion. If the knob 120 is removed in an attempt to open the latching mechanism 88, the diaphragm 90 cannot be moved.

It is to be appreciated that, in combination with this arrangement, there may be a sophisticated locking or tumbler mechanism (not shown) for preventing the turning of the knob 120 or screw drive 116. Such mechanisms are well known in the art.

Figure 10:
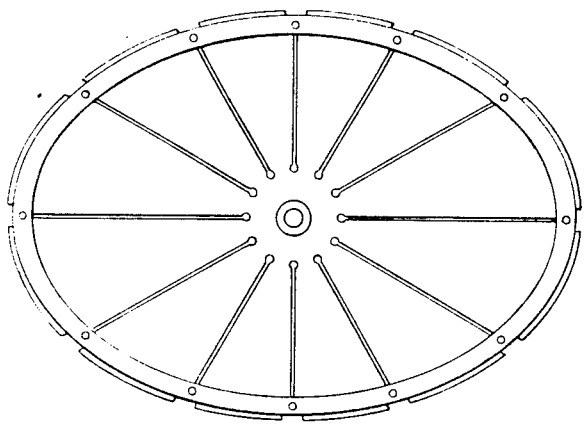
FIG. 10 is a plan view showing an elliptical configuration of the present invention.
Figure 11:
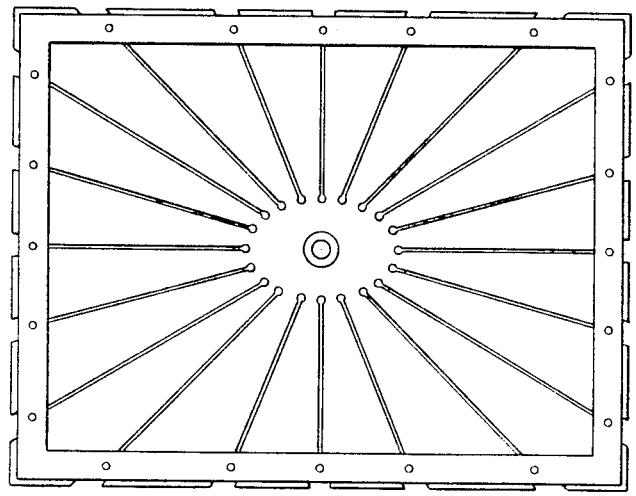
FIG. 11 is a plan view of another embodiment of the present invention in a square configuration.

Other non-circular embodiments of the present invention are shown in plan view in FIGS. 10 and 11. The operation and elements of these embodiments are similar to that described in connection with FIGS. 1–9.

Although there has been hereinabove described a specific arrangements of a latching mechanism in accordance with the present invention for the purpose of illustrating the manner in which the invention may be used to advantage, it should be appreciated that the invention is not limited thereto. Accordingly, any and all modifications, variations, or equivalent arrange-

What is claimed is:

1. A latching mechanism comprising:
    a flat planar resilient member having a perimeter lip, said member being split along a plurality of radial lines, said radial lines each terminating at respective points located about the center of said member and extending through said permitter lip, the continuity of said lip being interrupted only by splits lying on said radial lines;
    frame means having a continuous slot therein for receiving the entirety of said lip, and
    means for increasing and reducing the perimeter of said resilient member defined by said lip to uniformly extend from a position of disengagement with said continuous slot into a position of engagement therewith and to withdraw from said engagement through application of a force component substantially perpendicular to the plane of said planar resilient member resulting in a lateral insertion force.

2. A latching mechanism comprising:
    a thin resilient diaphragm surface having a center, a central portion located about said center, and a perimeter lip, said surface being split along a plurality of radial lines, said radial lines each terminating at respective points located about the center of said member and extending through said perimeter lip, the continuity of said lip being interrupted only by splits lying on said radial lines, said splits causing said surface to be capable of assuming a first open position wherein the portions of aid surface defined by said radial lines slop down away from the central portion of said surface and a second closed position wherein the entire said surface lies in a single plane;
    frame means having a continuous slot means therein for receiving the entirety of said lip, and
    means for mounting said surface with respect to said frame means such that said surface may assume said first and second positions and responsive to exertion of a force component substantially perpendicular to said plane for causing said surface to move from said first open position to said second closed position thereby increasing the perimeter of said resilient surface defined by said lip and causing each portion of said perimeter between each respective pair of said splits to uniformly and simultaneously extend from a position of nonengagement with said slot means into a position of engagement therewith.

* * * * *